(12) United States Patent
Blake et al.

(10) Patent No.: US 12,364,328 B1
(45) Date of Patent: Jul. 22, 2025

(54) PORTABLE VANITY CART

(71) Applicants: Shakia Blake, Douglasville, GA (US); Tonia Landry, Douglasville, GA (US)

(72) Inventors: Shakia Blake, Douglasville, GA (US); Tonia Landry, Douglasville, GA (US)

(*) Notice: Subject to any disclaimer, the term of this patent is extended or adjusted under 35 U.S.C. 154(b) by 378 days.

(21) Appl. No.: 18/070,548

(22) Filed: Nov. 29, 2022

(51) Int. Cl.
| A47B 31/00 | (2006.01) |
| A47B 21/06 | (2006.01) |
| A47G 1/02 | (2006.01) |
| B62B 3/02 | (2006.01) |
| B62B 3/10 | (2006.01) |
| H04M 1/04 | (2006.01) |

(52) U.S. Cl.
CPC .............. *A47B 31/00* (2013.01); *A47B 21/06* (2013.01); *A47G 1/02* (2013.01); *B62B 3/02* (2013.01); *B62B 3/10* (2013.01); *H04M 1/04* (2013.01); *A47B 2021/066* (2013.01); *A47B 2031/003* (2013.01)

(58) Field of Classification Search
CPC ........ B62B 3/02; B62B 3/10; A47B 2031/003
See application file for complete search history.

(56) References Cited

U.S. PATENT DOCUMENTS

| 1,409,609 | A | * | 3/1922 | Stockle | A47C 29/006 |
| | | | | | 135/147 |
| 2,819,938 | A | * | 1/1958 | Zerver | B25H 3/026 |
| | | | | | 312/201 |
| 3,156,510 | A | | 11/1964 | Hindin | |
| 3,339,938 | A | * | 9/1967 | Edmisson | B25H 3/06 |
| | | | | | 248/145 |
| 4,119,107 | A | | 10/1978 | Pinzone | |
| 4,715,573 | A | * | 12/1987 | Liegel | A47B 23/046 |
| | | | | | 248/129 |
| 5,181,681 | A | * | 1/1993 | Edwards | B25H 3/00 |
| | | | | | 108/106 |
| 6,182,583 | B1 | * | 2/2001 | Larson | A47C 3/30 |
| | | | | | 108/150 |
| 7,740,370 | B2 | | 6/2010 | Campbell | |
| 7,789,403 | B2 | | 9/2010 | Wilsher | |
| 8,636,016 | B1 | | 1/2014 | Lee | |
| 10,881,040 | B1 | * | 12/2020 | Herreid | B62B 5/00 |
| 11,129,471 | B1 | * | 9/2021 | Oglesby | A47B 13/023 |
| 11,904,922 | B1 | * | 2/2024 | Gonzalez | B62B 3/02 |
| 11,920,849 | B1 | * | 3/2024 | Green | A47B 31/00 |
| 2011/0030721 | A1 | | 2/2011 | Mendoza | |
| 2012/0217710 | A1 | * | 8/2012 | Houlihan | B62B 3/10 |
| | | | | | 280/35 |

(Continued)

FOREIGN PATENT DOCUMENTS

CA 2681776 4/2010

*Primary Examiner* — Erez Gurari

(74) *Attorney, Agent, or Firm* — Kyle A. Fletcher, Esq.

(57) ABSTRACT

The portable vanity cart is a vehicle. The portable vanity cart is configured for use in the storage of cosmetic media. The portable vanity cart transports the stored cosmetic media across a supporting surface. The portable vanity cart provides a plurality of mirror structures. The plurality of mirror structures generate an illumination and a plurality of reflections that are used in the application of the cosmetic media. The portable vanity cart comprises a pedestal structure, a telescopic stanchion structure, and a plurality of tray structures. The pedestal structure and the plurality of tray structures attach to the telescopic stanchion structure.

11 Claims, 3 Drawing Sheets

(56) References Cited

U.S. PATENT DOCUMENTS

| | | | | |
|---|---|---|---|---|
| 2013/0001904 | A1* | 1/2013 | Macias | B62B 3/02 |
| | | | | 280/47.26 |
| 2013/0200579 | A1* | 8/2013 | Abernethy | B62B 3/001 |
| | | | | 280/6.15 |
| 2019/0270471 | A1* | 9/2019 | Hazzard | H02J 7/0045 |
| 2020/0008596 | A1* | 1/2020 | Aguirre | A47G 19/08 |
| 2020/0290661 | A1* | 9/2020 | Kaidantsis | A47G 9/0223 |
| 2023/0309692 | A1* | 10/2023 | Liu | A47B 87/0223 |
| | | | | 211/126.12 |
| 2024/0308563 | A1* | 9/2024 | Dixson | B62B 5/0046 |

* cited by examiner

PORTABLE VANITY CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand carts having more than one transport wheel. (B62B3/00)

SUMMARY OF INVENTION

The portable vanity cart is a vehicle. The portable vanity cart is configured for use in the storage of cosmetic media. The portable vanity cart transports the stored cosmetic media across a supporting surface. The portable vanity cart provides a plurality of mirror structures. The plurality of mirror structures generate an illumination and a plurality of reflections that are used in the application of the cosmetic media. The portable vanity cart comprises a pedestal structure, a telescopic stanchion structure, and a plurality of tray structures. The pedestal structure and the plurality of tray structures attach to the telescopic stanchion structure.

These together with additional objects, features and advantages of the portable vanity cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable vanity cart in detail, it is to be understood that the portable vanity cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable vanity cart.

It is therefore important that the claims be regarded as including such equivalent construction insofar as they do not depart from the spirit and scope of the portable vanity cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
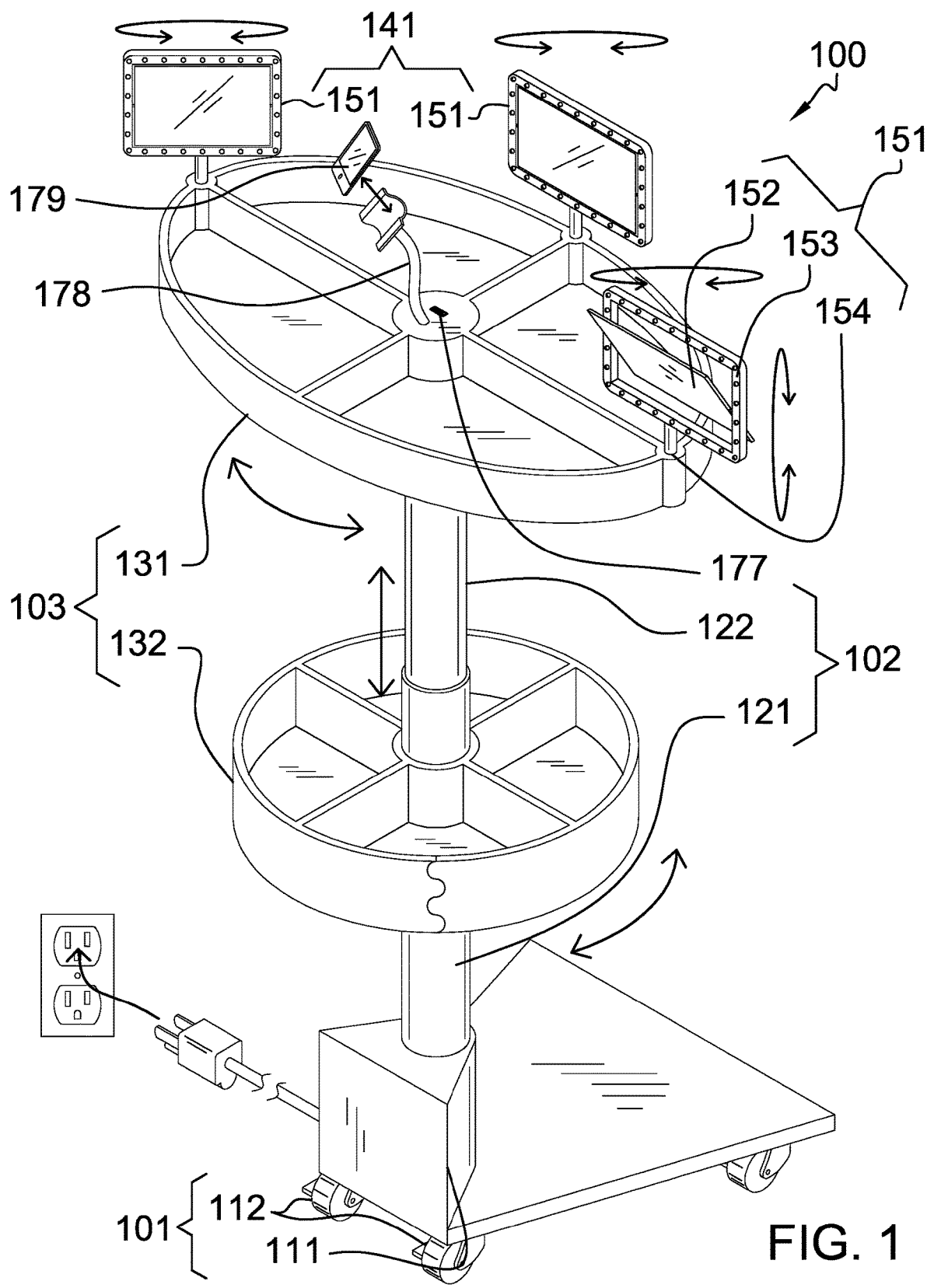
FIG. 1 is a perspective view of an embodiment of the disclosure.
Figure 2:
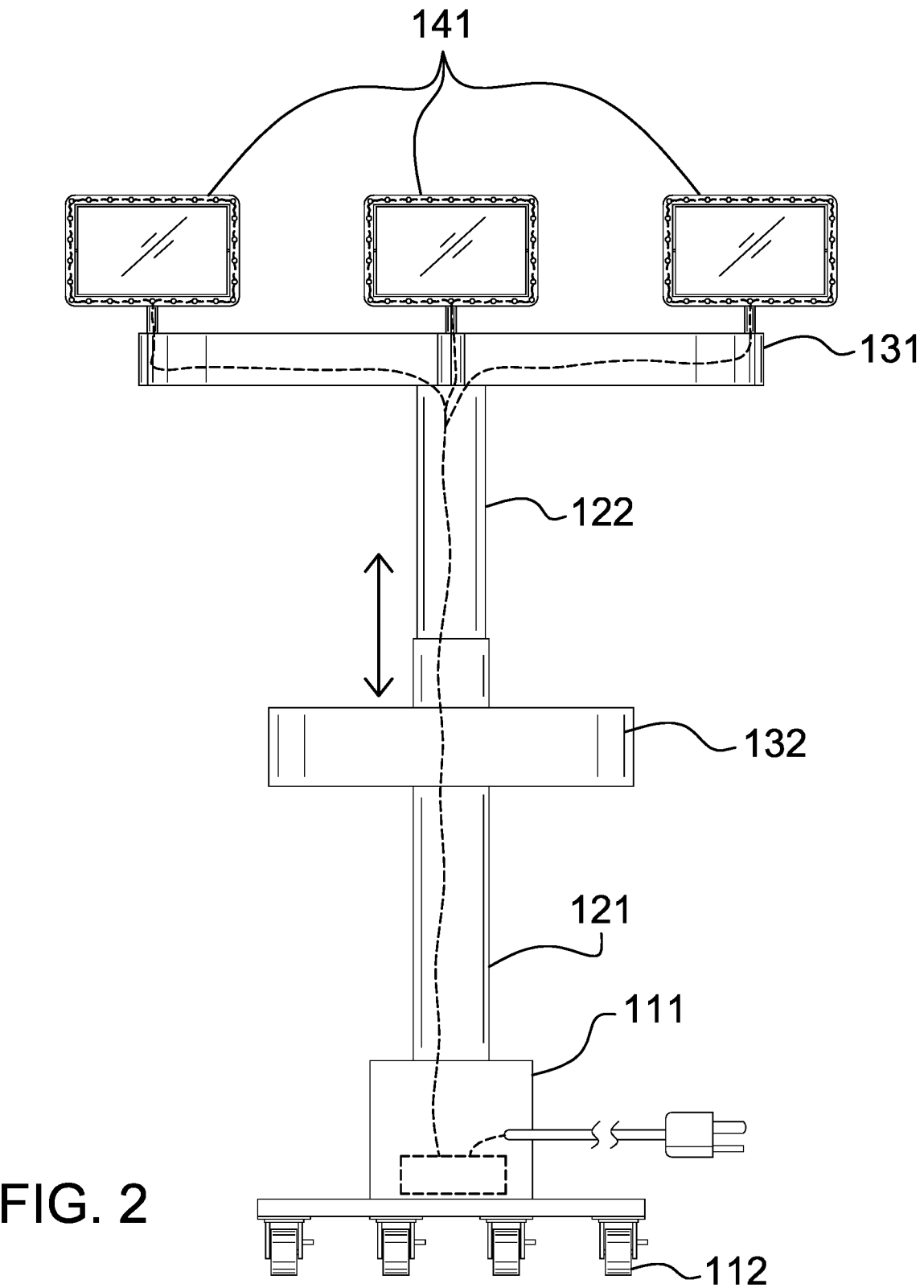
FIG. 2 is a front view of an embodiment of the disclosure.
Figure 3:
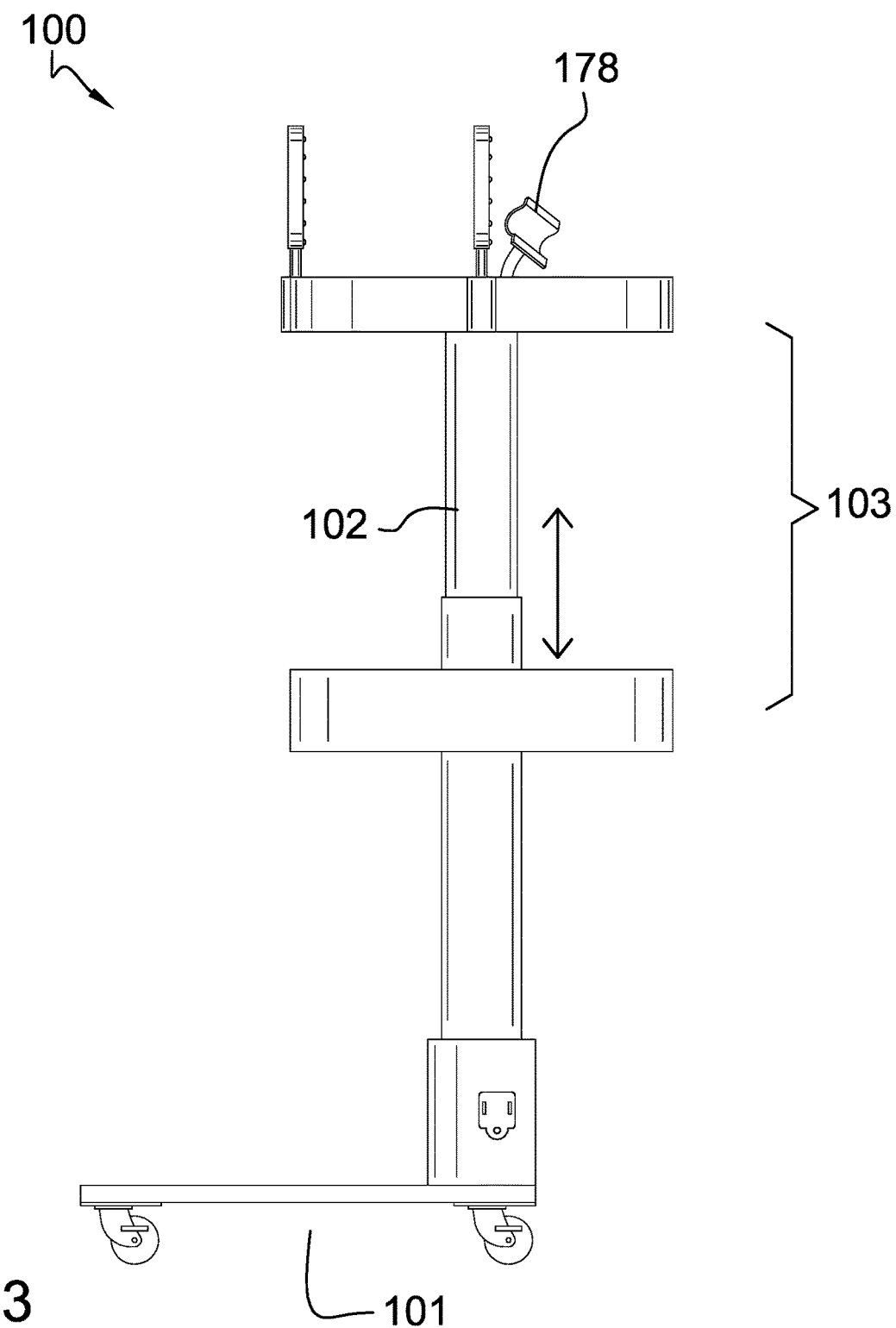
FIG. 3 is a side view of an embodiment of the disclosure.

Detailed reference will now be made to one or more potential embodiments of the disclosure, which are illustrated in FIGS. 1 through 3.

The portable vanity cart 100 (hereinafter invention) is a vehicle. The invention 100 is configured for use in the storage of cosmetic media. The invention 100 transports the stored cosmetic media across a supporting surface. The invention 100 provides a plurality of mirror structures 141. The plurality of mirror structures 141 generate an illumination and a plurality of reflections that are used in the application of the cosmetic media. The invention 100 comprises a pedestal structure 101, a telescopic stanchion structure 102, and a plurality of tray structures 103. The pedestal structure 101 and the plurality of tray structures 103 attach to the telescopic stanchion structure 102.

The pedestal structure 101 forms the inferior structure of the invention 100. The pedestal structure 101 is a rolling structure. The pedestal structure 101 allows the invention 100 to roll over the supporting surface. The pedestal structure 101 is a load bearing structure. The pedestal structure 101 transfers the loads of the telescopic stanchion structure 102 and the plurality of tray structures 103 to the supporting surface. The pedestal structure 101 comprises a base structure 111 and a plurality of wheels 112.

The base structure 111 is a mechanical structure. The base structure 111 is a rigid structure. The telescopic stanchion structure 102 attaches to the superior surface of the base structure 111. The telescopic stanchion structure 102 projects away from the base structure 111 in the vertical direction. The base structure 111 is a load bearing structure. The base structure 111 transfers the load received from the combination of the telescopic stanchion structure 102 and the plurality of tray structures 103 to the plurality of wheels 112.

The plurality of wheels 112 forms final link in the load path between the base structure 111 and the supporting surface. The plurality of wheels 112 forms a rotating structure that allows the invention 100 to roll over a supporting surface. The plurality of wheels 112 is a locking structure that allows the invention 100 to be locked into a fixed position on the supporting surface.

The telescopic stanchion structure 102 forms a stanchion that elevates the plurality of tray structures 103 above the supporting surface. The telescopic stanchion structure 102 forms a first composite prism structure. The span of the length of the center axis of the first composite prism structure of the telescopic stanchion structure 102 is adjustable. The elevation of the plurality of tray structures 103 above the pedestal structure 101 adjusts by adjusting the span of the length of the center axis of the telescopic stanchion structure 102. The telescopic stanchion structure 102 comprises a first stanchion structure 121 and a second stanchion structure 122.

The telescopic stanchion structure 102 is a telescopic structure that comprises a first stanchion structure 121, a second stanchion structure 122, and a detent. The detent is a mechanical device that locks and secures the first stanchion structure 121 to the second stanchion structure 122. The first stanchion structure 121 is a hollow prism that is further defined with an inner dimension. The second stanchion structure 122 is a prism that is further defined with an outer dimension. The second stanchion structure 122 is geometrically similar to the first stanchion structure 121.

The span of the outer dimension of the second stanchion structure 122 is lesser than the span of the inner dimension of the first stanchion structure 121 such that the second stanchion structure 122 inserts into the first stanchion structure 121 in a telescopic fashion to form a second composite prism structure. The span of the length of the telescopic stanchion structure 102 adjusts by adjusting the relative position of the second stanchion structure 122 within the first stanchion structure 121. The position of the second stanchion structure 122 relative to the first stanchion structure 121 is held in position using the detent. The detent is selected from the group consisting of a cotter pin, a G snap collar, a cam lock collar, a threaded clutch, a split collar lock, and a spring loaded ball lock.

Each tray structure selected from the plurality of tray structures 103 is a pan shaped structure. Each tray structure selected from the plurality of tray structures 103 has a disk shape. Each tray structure selected from the plurality of tray structures 103 attaches to the lateral face of the telescopic stanchion structure 102 such that the telescopic stanchion structure 102 inserts through the congruent ends of the disk structure of the plurality of tray structures 103 to form a master composite prism structure. Each tray structure selected from the plurality of tray structures 103 forms a storage structure used to contain the cosmetic media. Each tray structure selected from the plurality of tray structures 103 attaches to the telescopic stanchion structure 102 such that the selected tray structure rotates relative to the telescopic stanchion structure 102. Each selected tray structure rotates around an axis of rotation that aligns with the center axis of the master composite prism structure of the telescopic stanchion structure 102. The plurality of tray structures 103 comprises a superior tray 131 and an inferior tray 132.

The inferior tray 132 forms a container used to store cosmetic media. The inferior tray 132 attaches to the first stanchion structure 121 to form a third composite prism structure. The inferior tray 132 attaches to the first stanchion structure 121 such that the inferior tray 132 rotates relative to the first stanchion structure 121.

The superior tray 131 is a pan shaped structure. The superior tray 131 forms a container used to store cosmetic media. The superior tray 131 attaches to the second stanchion structure 122 to form a fourth composite prism structure. The superior tray 131 attaches to the second stanchion structure 122 such that the superior tray 131 rotates relative to the second stanchion structure 122.

The plurality of mirror structures 141 generates an illumination that assists in the topical application of the cosmetic media. The plurality of mirror structures 141 forms a plurality of reflective surfaces that assist in the application of the cosmetic media. The superior tray 131 comprises a plurality of mirror structures 141, a USB plug 177, and a smart phone holster 178.

The plurality of mirror structures 141 comprises a collection of individual mirror structures 151.

Each individual mirror structure 151 selected from the plurality of mirror structures 141 generates an illumination that assists in the topical application of the cosmetic media. Each individual mirror structure 151 selected from the plurality of mirror structures 141 forms a reflective surface 152 that assists in the application of the cosmetic media. Each individual mirror structure 151 selected from the plurality of mirror structures 141 is identical. Each individual mirror structure 151 mounts on the superior tray 131.

Each individual mirror structure 151 selected from the plurality of mirror structures 141 is a rotating structure such that the cant between the reflective surface 152 and the center axis of the telescopic stanchion structure 102 is adjustable. The rotation of each selected individual mirror structure 151 ensures that the cant between the reflective surface 152 of any first individual mirror structure 151 selected from the plurality of mirror structures 141 and the reflective surface 152 of any second individual mirror structure 151 selected from the plurality of mirror structures 141.

Each individual mirror structure 151 further comprises a reflective surface 152, an illumination circuit 153, and a universal joint 154. The reflective surface 152 is a mirror. The mirror is defined elsewhere in this disclosure. The illumination circuit 153 is an electric circuit. The illumination circuit 153 converts electric energy into electromagnetic radiation used to illuminate the area surrounding the plurality of mirror structures 141. The illumination circuit 153 is positioned around the perimeter of the reflective surface 152. The universal joint 154 is a locking universal joint 154. The universal joint 154 attaches the reflective surface 152 and the illumination circuit 153 to the superior tray 131. The universal joint 154 attaches to the superior tray 131 such that the reflective surface 152 rotates relative to the superior tray 131.

As mentioned above, the superior tray 131 includes a USB plug 177, and a smart phone holster 178. The USB plug 177 enables a smart phone 179 to be charged when in use with the invention 100. Moreover, the smart phone holster 178 is configured to support the smart phone 179 such that the smart phone 179 may be used to take a video or a picture of an end user.

The following definitions were used in this disclosure:
  Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.
  Cant: As used in this disclosure, a cant is an angular deviation from one or more reference lines (or planes) such as a vertical line (or plane) or a horizontal line (or plane).

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cosmetic: As used in this disclosure, cosmetic is an adjective that refers to a substance, a process, a procedure, or a device that is intended to improve the appearance of an individual or biological entity. By substance is meant a chemical compound such as a cosmetic media or pharmacologically active media. A cosmetic specialist is an individual who is designated to provide cosmetic services to a client.

Cosmetic Media: As used in this disclosure, a cosmetic media refers to a chemical substance that is topically applied to a biological organism. The purposes for a cosmetic media include, but are not limited to: a) cleaning the skin and the hair of the biological organism; b) changing the visual, olfactory, and tactile stimuli presented by the biological organism to other nearby biological organisms; and, c) the topical application of a pharmacologically active media.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a releasable fastening device that secures a rotating mechanical device into a fixed position.

Magnify: As used in this disclosure, the magnify means to increase the apparent size of an object through the use of an optical device.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Pharmacologically Active Media: As used in this disclosure, a pharmacologically active media refers to a chemical substance that has a biochemical or physiological effect on a biological organism.

Platform: As used in this disclosure, a platform is a raised horizontal surface that forms a load path to support objects placed on the superior surface of the platform.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Topical: As used in this disclosure, topical is an adjective that is associated with cosmetic and pharmacologically active media. Topical indicates that the cosmetic and pharmacologically active media are applied directly to the skin.

Tray: As used in this disclosure, a tray is a disk-shaped structure roughly shaped with a pan structure.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Universal Joint: As used in this disclosure, a universal joint is a method of joining a first object to as second object such that the first object rotates relative to the second object around two or more axes of rotation. When a universal joint is formed with a locking mechanism, a universal joint can further be used to lock the, often referred to as a cant, between the first object and the second object into a fixed position.

Vehicle: As used in this disclosure, a vehicle is a motorized device that is used for transporting passengers, goods, or equipment. The term motorized vehicle refers to a vehicle can move under power provided by an electric motor or an internal combustion engine. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A portable vanity cart comprising
a pedestal structure, a telescopic stanchion structure, and a plurality of tray structures;
wherein the pedestal structure and the plurality of tray structures attach to the telescopic stanchion structure;
wherein the portable vanity cart is a vehicle configured for use in the storage and transport of cosmetic media across a supporting surface;
wherein a plurality of mirror structures generates an illumination and a plurality of reflections that are used in the application of the cosmetic media;
wherein the telescopic stanchion structure forms a stanchion that elevates the plurality of tray structures above the supporting surface;
wherein the telescopic stanchion structure forms a first composite prism structure;
wherein the span of the length of the center axis of the first composite prism structure of the telescopic stanchion structure is adjustable;
wherein the elevation of the plurality of tray structures above the pedestal structure adjusts by adjusting the span of the length of the center axis of the telescopic stanchion structure.

2. The portable vanity cart according to claim 1
wherein the pedestal structure forms the inferior structure of the portable vanity cart;
wherein the pedestal structure is a rolling structure;
wherein the pedestal structure allows the portable vanity cart to roll over the supporting surface;
wherein the pedestal structure is a load bearing structure;
wherein the pedestal structure transfers the loads of the telescopic stanchion structure and the plurality of tray structures to the supporting surface.

3. The portable vanity cart according to claim 2
wherein each tray structure selected from the plurality of tray structures is a pan shaped structure;
wherein each tray structure selected from the plurality of tray structures has a disk shape;
wherein each tray structure selected from the plurality of tray structures attaches to the lateral face of the telescopic stanchion structure such that the telescopic stanchion structure inserts through the congruent ends of the disk structure of the plurality of tray structures to form a master composite prism structure;
wherein each tray structure selected from the plurality of tray structures forms a storage structure used to contain the cosmetic media;
wherein each tray structure selected from the plurality of tray structures attaches to the telescopic stanchion structure such that the selected tray structure rotates relative to the telescopic stanchion structure;

wherein each selected tray structure rotates around an axis of rotation that aligns with the center axis of the master composite prism structure of the telescopic stanchion structure.

4. The portable vanity cart according to claim 3
wherein the pedestal structure comprises a base structure and a plurality of wheels;
wherein the plurality of wheels attach to the base structure.

5. The portable vanity cart according to claim 4
wherein the telescopic stanchion structure comprises a first stanchion structure and a second stanchion structure;
wherein the second stanchion inserts into the first stanchion.

6. The portable vanity cart according to claim 5
wherein the base structure is a mechanical structure;
wherein the base structure is a rigid structure;
wherein the telescopic stanchion structure attaches to the superior surface of the base structure;
wherein the telescopic stanchion structure projects away from the base structure in the vertical direction;
wherein the base structure is a load bearing structure;
wherein the base structure transfers the load received from the combination of the telescopic stanchion structure and the plurality of tray structures to the plurality of wheels.

7. The portable vanity cart according to claim 6
wherein the plurality of wheels forms final link in the load path between the base structure and the supporting surface;
wherein the plurality of wheels forms a rotating structure that allows the portable vanity cart to roll over a supporting surface;
wherein the plurality of wheels is a locking structure that allows the portable vanity cart to be locked into a fixed position on the supporting surface.

8. The portable vanity cart according to claim 7
wherein the telescopic stanchion structure forms a stanchion that elevates the plurality of tray structures above the supporting surface;
wherein the span of the length of the center axis of the first composite prism structure of the telescopic stanchion structure is adjustable;
wherein the elevation of the plurality of tray structures above the pedestal structure adjusts by adjusting the span of the length of the center axis of the telescopic stanchion structure.

9. The portable vanity cart according to claim 8
wherein the first stanchion structure is a hollow prism that is further defined with an inner dimension;
wherein the second stanchion structure is a prism that is further defined with an outer dimension;
wherein the second stanchion structure is geometrically similar to the first stanchion structure;
wherein the span of the outer dimension of the second stanchion structure is lesser than the span of the inner dimension of the first stanchion structure such that the second stanchion structure inserts into the first stanchion structure in a telescopic fashion;
wherein the span of the length of the telescopic stanchion structure adjusts by adjusting the relative position of the second stanchion structure within the first stanchion structure.

10. The portable vanity cart according to claim 9
wherein the plurality of tray structures comprises a superior tray and an inferior tray;
wherein the inferior tray attaches to the first stanchion structure;
wherein the superior tray attaches to the second stanchion structure;
wherein the inferior tray forms a container used to store cosmetic media;
wherein the inferior tray attaches to the first stanchion structure such that the inferior tray rotates relative to the first stanchion structure;
wherein the superior tray is a pan shaped structure;
wherein the superior tray forms a container used to store cosmetic media;
wherein the superior tray attaches to the second stanchion structure such that the superior tray rotates relative to the second stanchion structure;
wherein the plurality of mirror structures generates an illumination that assists in the topical application of the cosmetic media;
wherein the plurality of mirror structures forms a plurality of reflective surfaces that assist in the application of the cosmetic media.

11. The portable vanity cart according to claim 10
wherein the superior tray includes a USB plug, and a smart phone holster;
wherein the USB plug enables a smart phone to be charged when in use with the portable vanity cart;
wherein the smart phone holster is configured to support the smart phone such that the smart phone may be used to take a video or a picture.

* * * * *